Dec. 6, 1960 J. CASTRONUOVO 2,962,985
MANICOTTI SHELL MAKER
Filed May 6, 1958 4 Sheets-Sheet 1

INVENTOR.
JOHN CASTRONUOVO
BY
Carl Miller
ATTORNEY

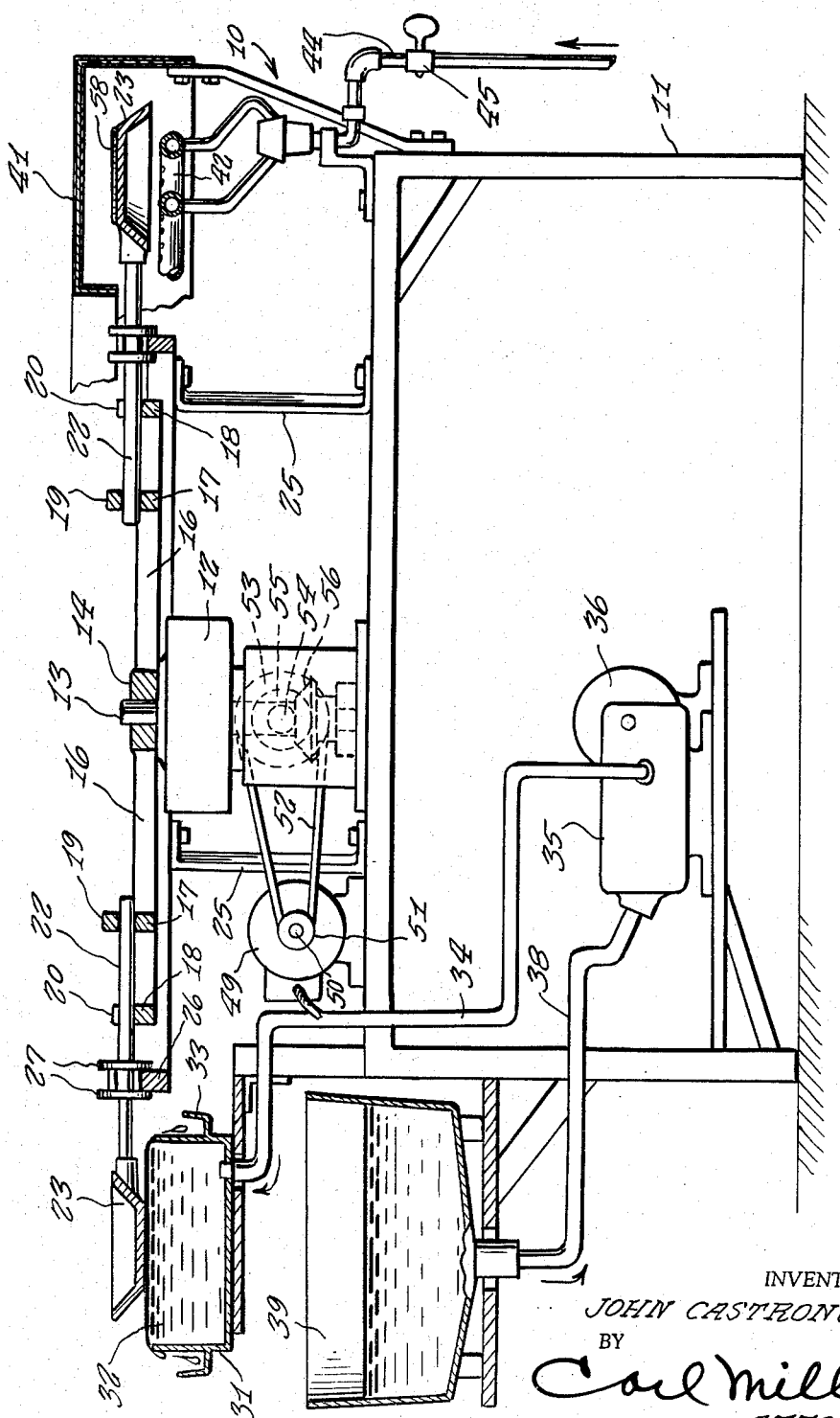

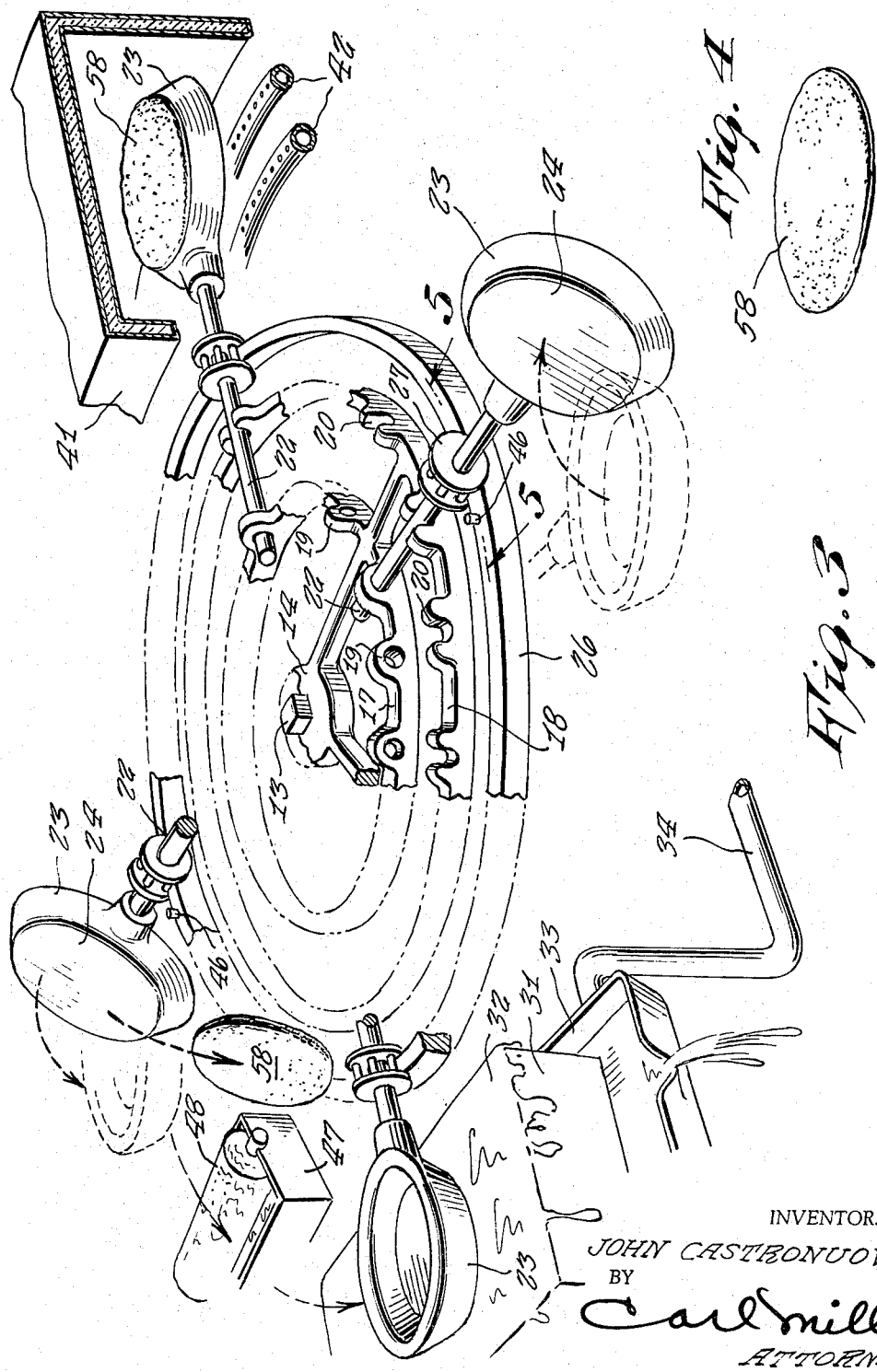

Dec. 6, 1960 J. CASTRONUOVO 2,962,985
MANICOTTI SHELL MAKER
Filed May 6, 1958 4 Sheets-Sheet 4

INVENTOR.
JOHN CASTRONUOVO
BY
Carl Miller
ATTORNEY

United States Patent Office 2,962,985
Patented Dec. 6, 1960

2,962,985

MANICOTTI SHELL MAKER

John Castronuovo, 216 Ave. U, Brooklyn, N.Y.

Filed May 6, 1958, Ser. No. 733,318

3 Claims. (Cl. 107—58)

This invention relates to baking equipment and, more, particularly, to an automatic baking machine.

It is an object of the present invention to provide a food manufacturing machine that is extremely simple in construction, efficient in operation, and which is particularly suited for baking large quantities of manicotti shell pancakes at a rapid rate of speed.

Another object of the present invention is to provide a food manufacturing machine in which all of the operations are completely automatic from the depositing of a layer of batter upon a baking pan to the removal of the finished baked goods from the baking pan.

Another object of the present invention is to provide apparatus for depositing a layer of batter of uniform thickness and texture upon the baking surface of a baking pan, transporting such baking pan to an oven, moving the pan and batter through the oven at a constant rate of speed for a predetermined period of time, and discharging the finished baked goods from such pan.

All of the foregoing and still further objects and advantages of this invention will become apparent from a study of the following specification, taken in connection with the accompanying drawing, wherein:

Figure 2 is an enlarged transverse cross sectional view taken along line 2—2 of Figure 1;

Figure 3 is a fragmentary perspective view, with certain parts broken away, of the apparatus shown in Figure 1;

Figure 4 is a perspective view of a pancake made with the apparatus of the present invention;

Figure 1:
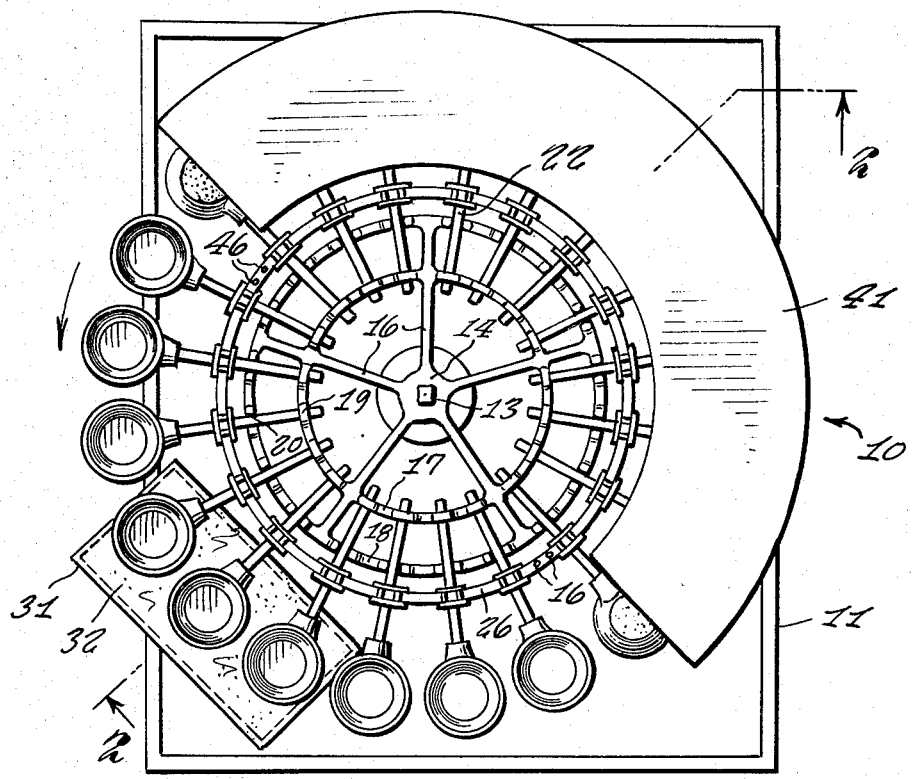
Figure 1 is a top plan view of a baking machine made in accordance with one form of the present invention in operative use.

Referring now to the drawing and more particularly to Figures 1 to 6 thereof, a baking machine 10 made in accordance with one form of the present invention is shown to include a substantially rigid base frame 11 upon which a gear box 12 is secured. This gear box 12 rotatably supports a main shaft 13 having a wheel 14 secured to the uppermost end thereof within a substantially horizontal plane. This wheel 14 includes a plurality of radially extending spokes 16, an inner rim 17, and an outer rim 18.

As is more clearly shown in Figure 3 of the drawing, the inner rim 17 of the wheel 14 includes rotatable bearings 19 and the outer rim 18 includes upwardly opening bearing guides 20, which bearings 19 and guides 20 rotatably support individual shafts 22 that extend radially of the wheel 14. A separate baking pan 23 having a substantially flat baking surface 24 is secured to the outermost end of each one of the radially extending shafts 22. A plurality of upwardly extending brackets 25 rigidly support an annular track 26 at substantially the same level as the inner and outer rims 17, 18 of the wheel 14. A pair of flat circular plates 27 are secured in spaced apart parallel relationship upon the mid section of each radially extending shaft 22, which plates 27 are further secured together by means of laterally extending rods 28 upon which roller bearing elements 29 are rotatably supported. Ordinarily, a pair of these roller bearing elements 29 roll along the upper surface of the annular track 26 so as to maintain the pan 23 in a predetermined position, but which are operative to effect rotation of the pan, as will be hereinafter more fully explained.

A receptacle 31 filled with batter 32 is disposed at one side of the track 26. A drip trough 33 encompassing the receptacle 31 is operative to conduct excess batter overflowing the sides of the receptacle 31 back into the main batter supply tank 39 directly thereunderneath. During operation of the machine, a supply line 38 conducts batter from the main tank 39 to a positive acting pump 35 which pumps the batter through the feed line 34 into the receptacle 31, constantly, thus continuously producing an overflow of the batter to the drip trough 33 to maintain the uppermost level of the batter within the receptacle 31 at least as high as the sides thereof.

An insulated housing 41 overlies an arc of the circular path of travel of the baking pans 23 at a point slightly spaced from the batter tray 31. A plurality of gas fired burners 42 are disposed within the housing 41 for supplying baking heat to the pans passing therethrough. A gas supply line 44 having a manually operated valve 45 continuously supplies the burners with fuel.

At a point between the terminal end of the oven enclosure 41 and the batter tray 31, a greasing pan 47 having a roller 48 disposed in the path of movement of the pans 23 is supported for applying a thin coat of baking grease to the pans before they are coated with the batter from the tray.

Figure 5:
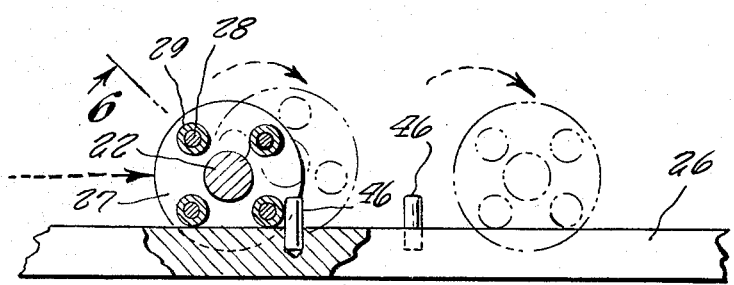
Figure 5 is an enlarged fragmentary cross sectional view taken along line 5—5 of Figure 3 showing certain parts of the present invention.
Figure 6:
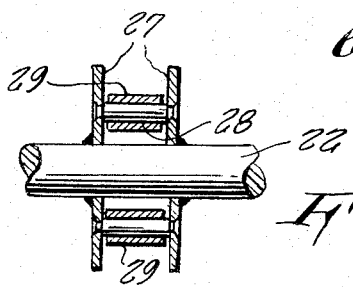
Figure 6 is a transverse cross sectional view taken along line 6—6 of Figure 5.

In actual use, a motor 49 having a drive shaft 50 with a drive pulley 51 secured thereto effects rotation of a transverse shaft 54 by means of a belt 52 which is trained over the drive pulley 51 and an associated pulley 53 secured to this shaft 54. The shaft 54 also supports a bevel drive gear 55 which is in meshing engagement with a similar bevel gear 56 secured to the vertical main shaft 13. As a result, the wheel 14 is rotated in a horizontal plane at a substantially constant rate of speed. As the wheel 14 rotates, the radially extending shafts 22 are also rotated by the inner and outer rims 17, 18, while the downwardly disposed rollers 29 carried upon the plates 27 roll along the guide track 26. This movement does not alter the position of the baking pans 23 until the rollers 28 come into contact with upwardly extending stops 46 on the rail or track 26. When this happens, as is shown in Figures 3 and 5 of the drawing, the shaft 22 is rotated 180°, thus inverting the baking pan 23. As a result, immediately following the application of a layer of batter 32 to the baking surface 24 of each pan 23, the pan is inverted so that it passes through the oven enclosure 41 with the layer of batter on the upper surface thereof and the heat from the burners 42 is applied to the lower surface of the pan. After leaving the oven enclosure 41, the pancake 58 is completely baked, and the pan 23 is again inverted by the action of a pair of similar stops 46 which causes the shaft 22 to rotate, thus discharging the finished pancake 58 from the pan to bring the baking surface 24 back to a lowermost position. This surface 24 is then brushed against the greasing roller 48 before the next layer of dough batter is applied thereto. As is clearly shown in Figure 2 of the drawing, the viscosity of the batter causes the center thereof to rise slightly above the upper levels of the sides of the tray 31, whereby the baking surface 24 of the pan 23 comes into contact with this batter to cause a thin layer to be deposited thereon. The baking operation is controlled through the speed of rotation of the wheel 14 and the intensity of the heat supplied to the pans in the oven enclosure. Other than this, the baking operation is completely automatic.

Figure 7:
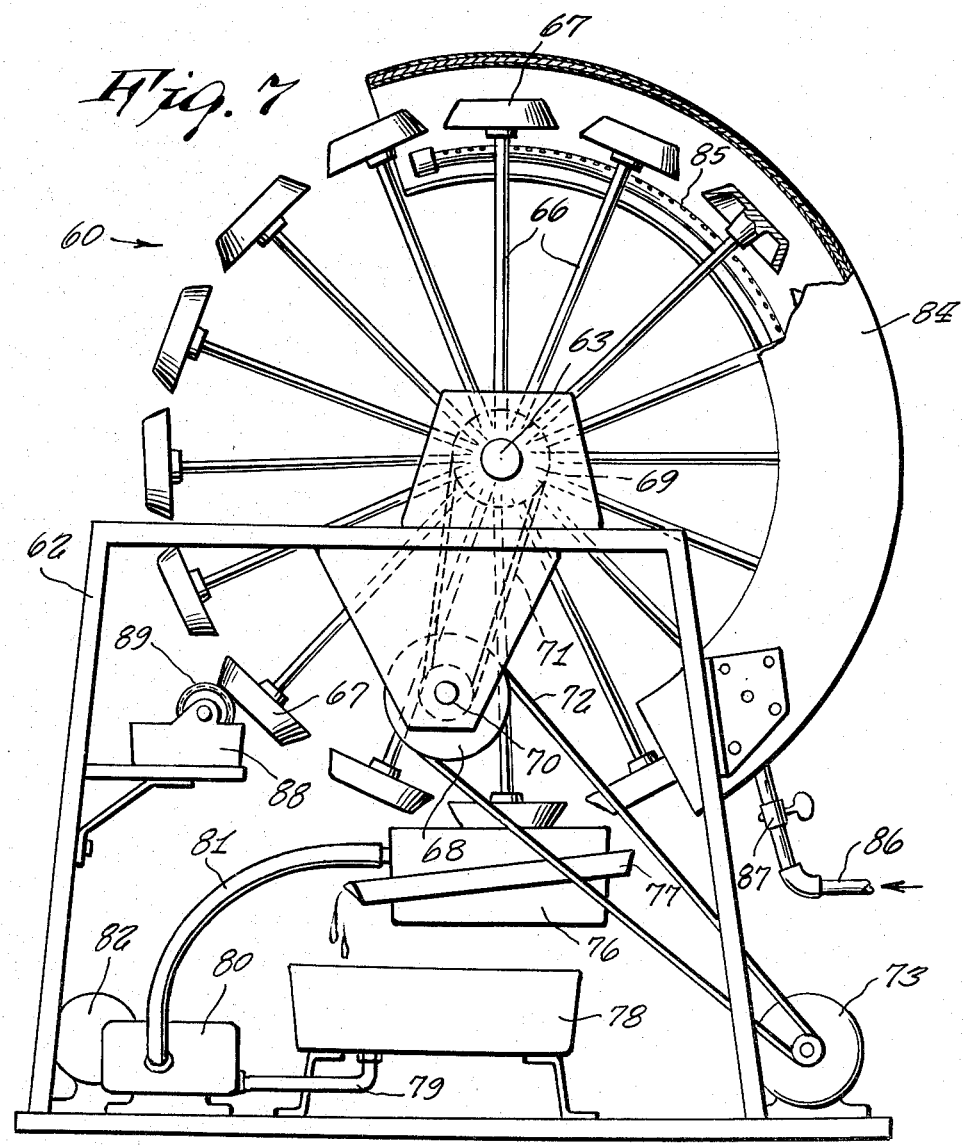
Figure 7 is a side elevational view, with parts broken away, of a modified form of construction.

Referring now to Figure 7 of the drawing, a slightly modified form of construction 60 is shown wherein the base frame 62 supports a horizontal main shaft 63. A plurality of radially outwardly extending shafts 66 are secured to the main shaft 63 for rotation within a substantially vertical plane. A baking pan 67 is secured to the outer end of each such radially extending shaft 66 for purposes hereinafter described. A pulley 69 secured to the main shaft 63 is driven by means of a belt 71 from a pulley 70 rotatably supported upon the main frame 62. Another pulley 68 carried by the smaller pulley 70 is driven by means of another belt 72 from the drive shaft of a motor 73. A batter tray 76 is supported directly beneath the baking pans 67 and includes a drip trough 77 which conducts overflowing batter to the main tank 78 disposed therebeneath. A return line 79 carries batter from the tank 78 to a positive drive pump 80 which, in turn, delivers the batter to the interior of the batter tray 76 so as to keep it completely filled at all times. An individual motor 82 operates the pump 80 independently of the drive mechanism for the pans.

An arcuate oven enclosure 84 extends partially around the path of movement of the baking pans 67 and has an inlet end adjacent to the batter tray 76. Thus, after a layer of batter has been deposited upon the baking surface of the pan 67, the pan is immediately brought into baking relationship within the enclosure 84 that is fired with burners 85 supplied with fuel from a fuel supply line 86 that is controlled by a valve 87. Adjacent to the front of the batter tray 76, a greasing pan 88 having a greasing roller 89 is supported for applying a layer of grease to the baking surface of the pan immediately before it is coated with a layer of batter. As the pans 67 are rotated by the motor 73, the pancakes carried by the pans leaving the oven are automatically dropped downwardly by gravity as the baking surface of each pan approaches a vertical position.

While this invention has been described with particular reference to the construction shown in the drawing, it is to be understood that such is not to be construed as imparting limitations upon the invention, which is best defined by the claims appended hereto.

Having thus described by invention, I claim as new and desire to secure by Letters Patent:

1. A food manufacturing machine comprising, in combination, a plurality of individual baking pans, motor means rotating said baking pans in spaced apart relationship in a group and within a single plane, a batter filled receptacle disposed along the path of movement of said individual pans for depositing a layer of batter upon each said pan during rotation thereof within said plane, an oven in the path of movement of said pans for baking the batter deposited thereon during said rotation of said pans within said plane, and a greasing device in the path of movement of said pans applying baking grease to said pans immediately prior to receiving said layer of batter thereon, a wheel supported for rotation in a horizontal plane, each of said pans including an elongated shaft, bearing means rotatably supporting said shafts radially upon said wheel with said pans at the outermost extremities thereof, said pans including a flat baking surface, said batter filled receptacle comprising an upwardly opening tray, pump means for continuously supplying batter to said tray to cause it to overflow the sides thereof, rotation of said wheel bringing said baking surface of said pans sequentially into contact with the top surface of said batter to effect the deposit thereon of a thin layer of batter, said oven comprising a housing, a plurality of burners supported within said housing for heating said pans passing therethrough.

2. A foot manufacturing machine comprising, in combination, a plurality of individual baking pans, motor means rotating said baking pans in spaced apart relationship in a group and within a single plane, a batter filled receptacle disposed along the path of movement of said individual pans for depositing a layer of batter upon each said pan during rotation thereof within said plane, an oven in the path of movement of said pans for baking the batter deposited thereon during said rotation of said pans within said plane, and a greasing device in the path of movement of said pans applying baking grease to said pans immediately prior to receiving said layer of batter thereon, a wheel supported for rotation in a horizontal plane, each of said pans including an elongated shaft, bearing means rotatably supporting said shafts radially upon said wheel with said pans at the outermost extremities thereof, said pans including a flat baking surface, said batter filled receptacle comprising an upwardly opening tray, pump means for continuously supplying batter to said tray to cause it to overflow the sides thereof, rotation of said wheel bringing said baking surface of said pans sequentially into contact with the top surface of said batter to effect the deposit thereon of a thin layer of batter, said oven comprising a housing, a plurality of burners supported within said housing for heating said pans passing therethrough, and means for automatically rotating said pans about the longitudinal axes of said shafts during the travel thereof from said batter tray to said oven from a batter receiving position with said baking surface facing downwardly to a baking position with said baking surface facing upwardly.

References Cited in the file of this patent

UNITED STATES PATENTS

| | | |
|---|---|---|
| Re. 19,685 | Brand | Sept. 3, 1935 |
| 2,078,641 | Spencer | Apr. 27, 1937 |
| 2,588,846 | Kane | Mar. 11, 1952 |
| 2,786,430 | Robbins et al. | Mar. 26, 1957 |